No. 711,879. Patented Oct. 21, 1902.
C. S. OSBORN.
EDUCATIONAL DEVICE.
(Application filed Apr. 10, 1902.)

(No Model.)

WITNESSES
Harry J Perkins
Stanley K McDonell

INVENTOR,
Chriton S Osborn
BY his ATTORNEY.
Edward Taggart

UNITED STATES PATENT OFFICE.

CLINTON S. OSBORN, OF NEW YORK, N. Y.

EDUCATIONAL DEVICE.

SPECIFICATION forming part of Letters Patent No. 711,879, dated October 21, 1902.

Application filed April 10, 1902. Serial No. 102,245. (No model.)

*To all whom it may concern:*

Be it known that I, CLINTON S. OSBORN, a citizen of the United States, residing at New York, in the county of New York and State of New York, have invented new and useful Improvements in Educational Devices, of which the following is a specification.

This invention relates to a new and useful educational device and game.

The invention consists in providing a set of blocks of suitable size which can be used for the game of dominoes, each block being provided with one or more of a series of figures built upon the straight-line theory of the origin of the ordinary Arabic number-symbols, the digits.

The invention further consists in combining on the same block one or more of these straight-line figures with the corresponding Arabic numeral or numerals, thus showing the relation between the straight-line figures and the symbols actually in common use.

The objects of the invention are to provide an educational device and game, to combine in the game amusement and education, and to furnish a suitable device which will assist educators in teaching not only the figures, but the rudimentary elements of arithmetic.

The foregoing I accomplish by means of the educational device and game hereinafter more fully described, and illustrated in the accompanying drawings, in which—

Figure 1:
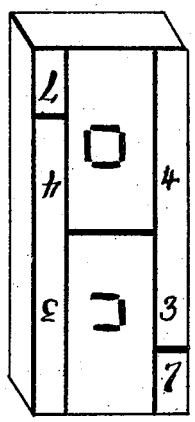
Figure 2:
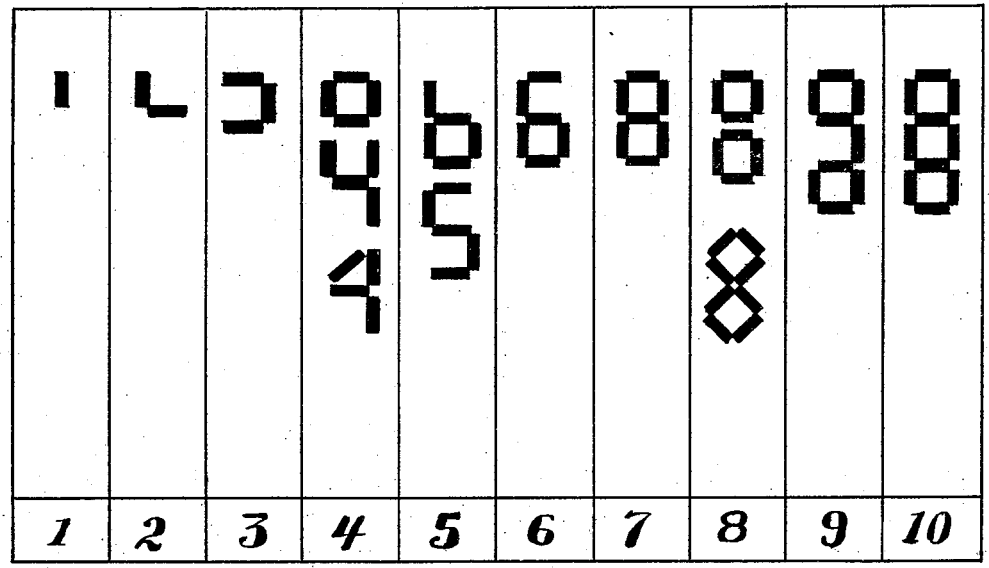

Figure 1 shows a form of domino-block, illustrating two figures constructed out of straight lines, one representing figure "3" and the other figure "4." Fig. 2 shows in plan a table of straight-line figures or numerals "1" to "10," inclusive. This figure also shows at the bottom the ordinary Arabic numerals corresponding to the figures constructed of straight lines.

In Fig. 2 each perpendicular space of the series has been numbered to correspond with the number represented by each straight-line figure—for example, in space 1 a single straight line indicating "1;" in space 2, two straight lines placed at an angle to represent the numeral "2." In space 3 are placed three straight lines to represent the numeral 3. In space 4 the upper figure is shown by four equal sides. The figure below is shown in the form of an ordinary figure "4" as the same is frequently made, and the third one shows the ordinary printed figure "4." In space 5 the upper figure shows the four straight lines arranged to represent the figure "4" and a single straight line added thereto. Below this figure is another form which resembles somewhat the ordinary figure "5" as printed, and below the latter is printed the ordinary figure "5." In space 6 are arranged six straight lines to represent the figure or numeral "6," and below the same is printed the ordinary figure "6." In space 7 are arranged seven straight lines to represent the figure or numeral "7," and below the same is arranged the ordinary figure "7." In space 8 the upper figure shows two squares arranged one above the other, each containing four straight lines. This is modified somewhat in the figure below to represent the figure "8," and below the modified form is arranged the ordinary numeral "8." In space 9 is shown a figure composed of nine straight lines arranged to represent approximately the numeral "9," and below the same is arranged the ordinary figure "9," and in space 10 is arranged ten straight lines to represent the numeral "10," and below the same is printed the ordinary figure "10."

It will be seen from Fig. 2 that each figure of lower order enters integrally into the composition of every subsequent figure, thus constituting a series of educational values when applied to domino-blocks as described. One or two of these symbols or figures are printed or impressed in any suitable manner upon the face of a block similar to a domino-block, as shown in Fig. 1, and these blocks are usually constructed of a size suitable for playing dominoes, but preferably of a larger size than I usually use in order to adapt themselves for use by children. The block is preferably twice as long as it is wide and of suitable thickness to stand readily upon its edge. Each and every one of the straight-line figures or symbols above referred to may be constructed out of the domino-blocks by placing them in the proper position. This may be done by placing them upon edge or by laying them flat, as will be evident.

In order to accustom the child to the use of numbers, I construct the block in the form shown in Fig. 1, placing on the margins the Arabic numerals to correspond with the straight-line symbols and also a footing of the Arabic numerals to correspond with the total number of straight lines used in making the straight-line figures. By building up with the domino-blocks the series of straight-line figures shown in Fig. 2 and then by separating each resulting figure into the groups of smaller figures which compose it the child readily learns the numeral combinations up to twenty, because of the similarity between the straight-line figures and the corresponding Arabic symbols and the association of the two given upon the same block. This knowledge readily passes over from the straight-line to the ordinary symbols. Finally these number facts are fixed in the child's mind by the use of the domino-blocks bearing these figures in the game of dominoes.

Having thus described my invention, what I claim to have invented, and desire to secure by Letters Patent, is—

1. In an educational device, a block provided on one face with a straight-line figure and an Arabic character.

2. In an educational device, an elongated rectangular block provided on one face with a straight-line figure and an Arabic character.

3. In an educational device, a block provided on one face with a figure formed of a plurality of straight lines and further provided on the said face with an Arabic character to indicate the total number of lines forming the figure.

4. In an educational device, a block provided on one face with a figure formed from a plurality of straight lines and further provided on the said face with a plurality of Arabic characters.

In testimony whereof I have hereunto set my hand in presence of two subscribing witnesses.

CLINTON S. OSBORN.

Witnesses:
P. W. DYKEMA,
H. K. BASSETT.